United States Patent
Kang

(10) Patent No.: US 10,282,998 B2
(45) Date of Patent: May 7, 2019

(54) VEHICLE SYSTEM AND VEHICLE CONTROLLER FOR CONTROLLING VEHICLE

(71) Applicants: DENSO International America, Inc., Southfield, MI (US); DENSO CORPORATION, Kariya, Aichi-pref. OT (JP)

(72) Inventor: Te-Ping Kang, Ann Arbor, MI (US)

(73) Assignees: DENSO International America, Inc., Southfield; DENSO CORPORATION, Kariya (JP)

(*) Notice: Subject to any disclaimer, the term of this patent is extended or adjusted under 35 U.S.C. 154(b) by 183 days.

(21) Appl. No.: 15/461,855

(22) Filed: Mar. 17, 2017

(65) Prior Publication Data
US 2018/0268703 A1    Sep. 20, 2018

(51) Int. Cl.
| | | |
|---|---|---|
| G08G 1/16 | (2006.01) |
| G05D 1/00 | (2006.01) |
| G05D 1/02 | (2006.01) |
| B60W 30/18 | (2012.01) |
| B60W 10/04 | (2006.01) |
| B60W 10/20 | (2006.01) |
| B60W 50/00 | (2006.01) |
| G08G 1/015 | (2006.01) |
| G06K 9/00 | (2006.01) |
| G01S 19/13 | (2010.01) |

(52) U.S. Cl.
CPC ............. *G08G 1/167* (2013.01); *B60W 10/04* (2013.01); *B60W 10/20* (2013.01); *B60W 30/18163* (2013.01); *B60W 50/0098* (2013.01); *G05D 1/0061* (2013.01); *G05D 1/0214* (2013.01); *G06K 9/00791* (2013.01); *G08G 1/166* (2013.01); *B60W 2550/20* (2013.01); *B60W 2710/20* (2013.01); *B60W 2720/10* (2013.01); *G01S 19/13* (2013.01); *G05D 1/0088* (2013.01)

(58) Field of Classification Search
CPC .......... G08G 1/16; G08G 1/161; G08G 1/162; G08G 1/163; G08G 1/166; G08G 1/167; B60W 30/18; B60W 30/18009; B60W 30/18163; G05D 1/0055; G05D 1/0061; G05D 1/0214
See application file for complete search history.

(56) References Cited

U.S. PATENT DOCUMENTS

| | | | | |
|---|---|---|---|---|
| 8,700,305 B2 * | 4/2014 | Hayakawa | ................ | B60T 7/22 701/301 |
| 9,384,417 B1 * | 7/2016 | Domanski | ................. | G06T 7/60 |
| 9,475,491 B1 * | 10/2016 | Nagasaka | ............ | B60W 30/16 |

(Continued)

*Primary Examiner* — Thomas G Black
*Assistant Examiner* — Sara J Lewandroski

(57) ABSTRACT

A vehicle system includes a vehicle size sensor mounted in a subject vehicle, the vehicle size sensor configured to detect whether a leading vehicle in front of the subject vehicle is oversized, and a processor coupled to the subject vehicle and the vehicle size sensor. The subject vehicle is configured to perform an assisted passing of the leading vehicle based on a passing parameter that defines a characteristic of the assisted passing, and the processor is programmed to, during the assisted passing: communicate with the vehicle size sensor to determined whether the leading vehicle is oversized, and modify the passing parameter when the leading vehicle is determined to be oversized.

14 Claims, 3 Drawing Sheets

(56) References Cited

U.S. PATENT DOCUMENTS

| | | | | |
|---|---|---|---|---|
| 2013/0184926 A1* | 7/2013 | Spero | ................... | B62D 1/28 |
| | | | | 701/26 |
| 2016/0129919 A1* | 5/2016 | Kubo | ................... | G08G 1/167 |
| | | | | 340/441 |
| 2016/0318515 A1* | 11/2016 | Laur | ................... | G05D 1/0061 |
| 2017/0101102 A1* | 4/2017 | Matei | ................ | B60W 30/18163 |
| 2017/0174262 A1* | 6/2017 | Kobayashi | ............... | B60Q 3/00 |
| 2017/0240176 A1* | 8/2017 | Aoki | ............... | B60W 30/18163 |
| 2017/0285647 A1* | 10/2017 | Saito | ................... | B60W 10/08 |
| 2017/0355306 A1* | 12/2017 | Bellotti | ................... | B60R 1/00 |
| 2018/0265123 A1* | 9/2018 | Mardh | ................ | B62D 5/0463 |
| 2018/0268225 A1* | 9/2018 | Sakashita | ........... | G06K 9/00798 |

* cited by examiner

| OVERSIZE TYPE | PRIOR TO LANE CHANGE STEP | PRIOR TO PASSING STEP | PRIOR TO LANE RETURN STEP |
|---|---|---|---|
| WIDTH | TERMINATE BASED ON ROAD TYPE | INCREASE LATERAL DISTANCE | INCREASE FOLLOWING DISTANCE |
| LENGTH | N/A | TERMINATE BASED ON ROAD TYPE OR INCREASE PASSING SPEED | INCREASE FOLLOWING DISTANCE |
| HEIGHT | TERMINATE BASED ON ROAD TYPE | N/A | INCREASE FOLLOWING DISTANCE |

VEHICLE SYSTEM AND VEHICLE CONTROLLER FOR CONTROLLING VEHICLE

TECHNICAL FIELD

The present disclosure relates to a vehicle system and a vehicle controller for controlling a vehicle.

BACKGROUND

In recent times, assisted driving and automatic driving have emerged as trending technologies. As one example of such technologies, a vehicle controller may perform an assisted passing or an automatic passing by controlling the steering and powertrain systems of a vehicle. However, there is a concern that with such technologies, the assisted or automatic passing may not sufficiently account for the safety or comfort of a passenger when passing an oversized vehicle.

SUMMARY

According to one aspect of the present disclosure, a vehicle system includes a vehicle size sensor mounted in a subject vehicle, the vehicle size sensor configured to detect whether a leading vehicle in front of the subject vehicle is oversized, and a processor coupled to the subject vehicle and the vehicle size sensor. The subject vehicle is configured to perform an assisted passing of the leading vehicle based on a passing parameter that defines a characteristic of the assisted passing, and the processor is programmed to, during the assisted passing: communicate with the vehicle size sensor to determined whether the leading vehicle is oversized, and modify the passing parameter when the leading vehicle is determined to be oversized.

According to another aspect of the present disclosure, a vehicle controller for controlling a subject vehicle includes central processing unit and a memory coupled to the central processing unit. The central processing unit is coupled to a vehicle size sensor mounted in the subject vehicle, the vehicle size sensor configured to detect whether a leading vehicle in front of the subject vehicle is oversized, and the central processing unit is programmed to, when the subject vehicle is performing an assisted passing of the leading vehicle based on a passing parameter that defines a characteristic of the assisted passing: communicate with the vehicle size sensor to determined whether the leading vehicle is oversized, and modify the passing parameter when the leading vehicle is determined to be oversized.

Still other objects, advantages, and features of the present disclosure will become apparent after considering the detailed description and drawings.

DETAILED DESCRIPTION

First Embodiment

A first embodiment of the present disclosure will be explained with reference to FIGS. 1 to 4.

Figure 1:
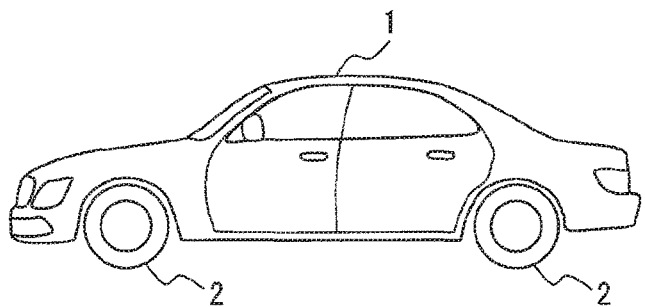
FIG. 1 is an overview of a vehicle.

FIG. 1 shows a subject vehicle 1 including a plurality of wheels 2. While FIG. 1 shows a sedan type passenger vehicle, this is not intended to be limiting. The present disclosure is equally applicable to all types of road vehicles, including trucks, busses, as well as specialized vehicles such as agricultural machinery.

Figure 2:
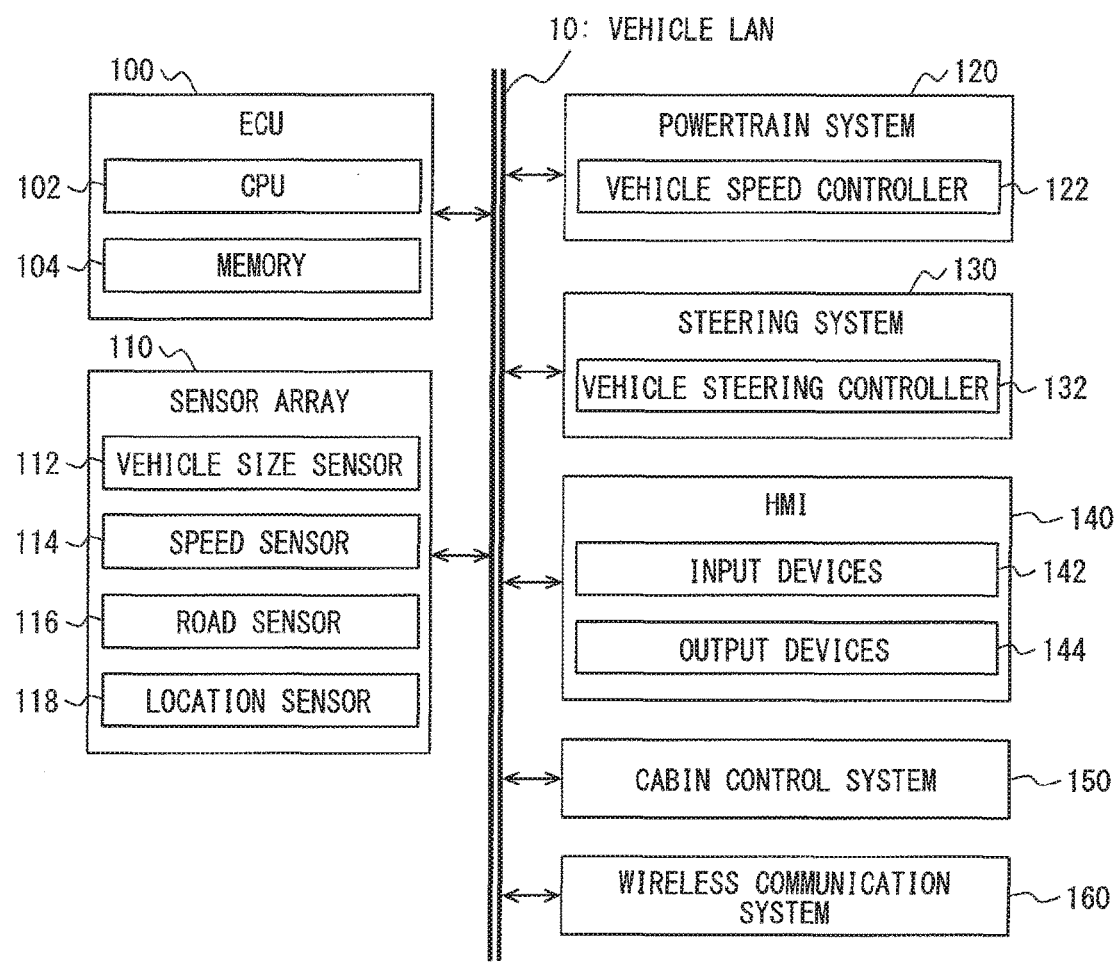
FIG. 2 is a system view of a vehicle LAN.

The subject vehicle 1 includes a variety of on-board systems as shown in FIG. 2. Here, FIG. 2 is a system diagram, in which a vehicle local-area network (LAN) 10 serves as a network bus which interconnects an electronic control unit (ECU) 100, a sensor array 110, a powertrain system 120, a steering system 130, a human-machine interface (HMI) 140, a cabin control system 150, and a wireless communication system 160.

The ECU 100 is a processor which includes a central processing unit (CPU) 102 and a memory 104. The CPU 102 is preferably a microcomputer or microprocessor. The memory 104 is preferably a semiconductor memory such as random access memory (RAM), read only memory (ROM), flash memory, of a combination of these. The memory 104 has stored thereon instructions which program the CPU 102 to perform a variety of tasks as will be described later. In an alternative embodiment, the ECU 100 may be implemented as an off-board remote processor, such as through the use of a remote cloud computing server which communicates with the subject vehicle 1 via the wireless communication system 160. The ECU 100 serves as a vehicle controller which controls the subject vehicle 1. The ECU 100 and the subject vehicle 1 together form a vehicle system that provides lane change assistance as will be described below.

The sensor array 110 is a collection of various sensors, among which includes a vehicle size sensor 112, a speed sensor 114, a road sensor 116, and a location sensor 118. Each of these sensors acts as a driving condition sensor that detect a driving condition related to the subject vehicle 1, and may be physically mounted in different locations of the subject vehicle 1. In addition, as shown in FIG. 2, the sensor array 110 is coupled to the ECU 100 through the vehicle LAN 10. In an alternative embodiment, the sensor array 110 may be directly connected to the ECU 100.

The powertrain system 120 controls the powertrain of the subject vehicle 1. For example, the powertrain system 120 may control the acceleration, deceleration, and braking of the subject vehicle 1. The powertrain system 120 includes a vehicle speed controller 122 which interfaces with external devices. In the present embodiment, the vehicle speed controller 122 receives command signals from the ECU 100, and controls the speed of the subject vehicle 1 in accordance with those command signals. In FIG. 2, the vehicle speed controller 122 is coupled to the ECU 100 through the vehicle LAN 10. In an alternative embodiment, the vehicle speed controller 122 may be directly connected to the ECU 100.

The steering system 130 controls the steering (i.e., the heading) of the subject vehicle 1 by controlling at least one of the wheels 2 of the subject vehicle 1. The steering system 130 includes a vehicle steering controller 132 which interfaces with external devices. In the present embodiment, the vehicle steering controller 132 receives command signals from the ECU 100, and controls the heading of the subject vehicle 1 in accordance with those command signals. In FIG. 2, the vehicle steering controller 132 is coupled to the ECU 100 through the vehicle LAN 10. In an alternative embodiment, the vehicle steering controller 132 may be directly connected to the ECU 100.

The HMI 140 allows a passenger to input information to the subject vehicle 1, and allows the passenger to receive information about the subject vehicle 1. The HMI 140 includes a plurality of input devices 142 and a plurality of output devices 144. The input devices 142 include, but are not limited to, a keyboard, a keypad, a touch screen, a voice input channel, as well as wired and wireless protocols for receiving user input from another device. For example, the input devices 142 may include a short range wireless transceiver which receives user input from a mobile device operated by the passenger. The output devices 144 include, but are not limited to, a display for visual output, a speaker for audio output, tactile feedback elements (e.g., embedded in a steering wheel or seat), as well as the above mentioned wired and wireless protocols, which may be used to output data to a mobile device operated by a passenger.

The cabin control system 150 controls various miscellaneous aspects of the subject vehicle 1, such as door locking and lighting. The wireless communication system 160 allows the subject vehicle 1 to communicate with other vehicles as well as infrastructure. The wireless communication system 160 may allow communication over a wide variety of protocols such as cellular, short range wireless, and so on.

While the system diagram of FIG. 2 shows each of the ECU 100, the sensor array 110, the powertrain system 120, the steering system 130, the HMI 140, the cabin control system 150, and the wireless communication system 160 as separate systems, this is not intended to limit the physical relationships between these systems. For example, the vehicle size sensor 112 of the sensor array 110 may be physically mounted on the front of the subject vehicle 1, while the location sensor 118 of the sensor array 110 may be physically mounted inside the dashboard of the subject vehicle 1. Similarly, each of the vehicle speed controller 122 and the vehicle steering controller 132 may be implemented as part of the ECU 100. In other words, while FIG. 2 shows a system layout, this does not limit the physical layout of the network. Additionally, while FIG. 2 shows the use of the vehicle LAN 10, this is merely illustrative and not intended to be limiting. Each of the system components may be directly connected to each other instead.

Figure 3A:
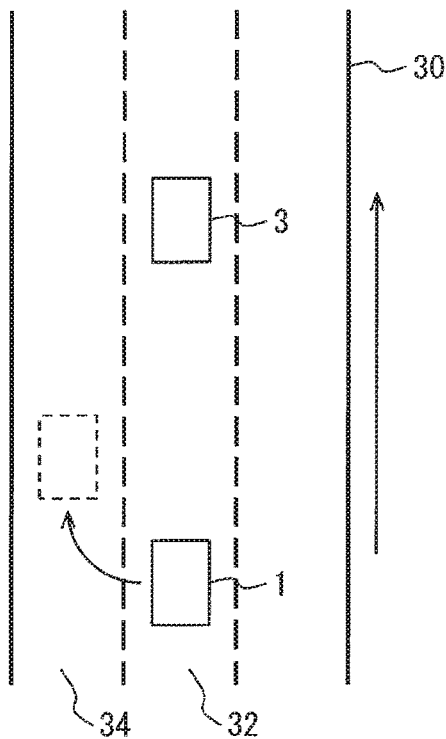
FIG. 3A shows a lane change step during an assisted passing.

Next, each of the sensors in the sensor array 110 will be described. The vehicle size sensor 112 detects a vehicle size of a leading vehicle 3. In particular, the vehicle size sensor 112 detects the size of the leading vehicle 3 to determine whether the leading vehicle 3 is an oversized vehicle. In this context, as shown in FIG. 3A, the leading vehicle 3 refers to a vehicle directly in front of the subject vehicle 1, i.e. in the same driving lane 32. In FIG. 3A, the direction of travel is upwards, as shown by the arrow.

In the present embodiment, the vehicle size sensor 112 is implemented as an optical camera which optically identifies whether the leading vehicle 3 is oversized. In addition to an optical camera, or as an alternative to an optical camera, the vehicle size sensor 112 may include a radar sensor to detect whether the leading vehicle 3 is oversized. Further, the vehicle size sensor 112 may optionally identify whether the leading vehicle 3 is oversized through inter-vehicle communications.

In the present embodiment, the term "oversized" refers to one or more of being oversized in width (i.e., the left-right direction in FIG. 3A), length (i.e., the top-down direction FIG. 3A), and height (i.e., in and out of the page in FIG. 3A).

In addition, the term "oversized" in the present disclosure is not intended to refer to any specific values, but rather simply refer to being a greater size than a typical size passenger vehicle. Instead, for example, the specific values for may be set by a manufacturer based on regulatory definitions for "oversized vehicles", or set by a user based on personal preferences. In any event, the term "oversized" used herein is intended to capture any and all such specific values. The vehicle size sensor 112 may output the size of the leading vehicle 3 (e.g., raw optical data describing the size of the leading vehicle 3) to the ECU 100 so that the ECU 100 makes the determination as to whether the leading vehicle 3 is oversized. Alternatively, the vehicle size sensor 112 may directly output the determination of whether the leading vehicle 3 is oversized to the ECU 100.

The speed sensor 114 detects a speed of the leading vehicle 3. The speed sensor 114 may be implemented as an optical camera that determines the speed of the leading vehicle 3 by visually calculating a relative speed between the leading vehicle 3 and the subject vehicle 1, then adding this relative speed to the current speed of the subject vehicle 1. Alternatively, the speed sensor 114 may be implemented as a radar sensor. Other implementations of the speed sensor 114 are contemplated and considered to be within the gist of the present disclosure. The speed sensor 114 outputs the detected speed of the leading vehicle 3 to the ECU 100.

The road sensor 116 detects a road type of a road on which the subject vehicle 1 is travelling. In the present embodiment, the road sensor 116 is implemented as an optical camera which identifies the physical characteristics of the road, including the number of lanes, the radius of curvature of the lanes, the width of each lane, the presence of a center divide, the presence of a shoulder, the presence of construction, road roughness, and so on. The road sensor 116 outputs the detected road type of the road to the ECU 100.

The location sensor 118 includes a GPS receiver and a memory device that has stored thereon map information. The map information preferably includes road information such as the width of lanes, the shapes of lanes, the speed limit of roads, the presence of construction work, and so on. The location sensor 118 detects a current location of the subject vehicle 1 along with corresponding road information obtained from the map information which describes the current road along which the subject vehicle 1 is travelling. In the present embodiment, the location sensor 118 also outputs the stored road information as a road type of the road to the ECU 100. In other words, the location sensor 118 outputs similar information as the road sensor 116. Accordingly, the location sensor 118 is used in conjunction with the road sensor 116, and may be relied upon if, for example, the road sensor 116 is unable to accurately detect some aspect of the road due to low visibility. In an alternative embodiment, the location sensor 118 may be provided in place of the road sensor 116.

It should be noted that any one or more of the vehicle size sensor 112, the speed sensor 114, and the road sensor 116 may be implemented as the same optical camera, or as separate sensors. In each of these cases, an accommodating image processor and memory may be provided to process the optical data, or the optical data may be directly transmitted to the ECU 100 for processing by the ECU 100 itself. Further, the sensor array 110 may include additional sensors, not illustrated, for use in general purpose assisted or automatic driving. For example, the sensor array 110 may include a general purpose traffic camera that detects the relative positions of all vehicles in the immediate vicinity of the subject vehicle 1, in order to safely perform an assisted lane change or an assisted passing.

In the present embodiment, the subject vehicle 1 is configured to perform an assisted passing of the leading vehicle 3. In particular, the term "assisted passing" as used herein refers to a three step process shown in FIGS. 3A to 3C, as described below. It should be noted that the present disclosure is not limited to the ECU 100 executing the assisted passing. For example, the subject vehicle 1 may include additional ECUs (not illustrated) which are responsible for various aspects of assisted or automatic driving, and these additional ECUs may perform one or more steps of the assisted passing described below. Accordingly, while the follow description may refer to an example where the ECU 100 controls the subject vehicle 1 to perform the assisted passing, this example is not intended to be limiting.

In addition, in the present embodiment, while the assisted passing is performed by the subject vehicle 1 without input from passengers, the assisted passing may be manually initiated by a passenger, e.g., through the input devices 142 of the HMI 140. Alternatively, the assisted passing may be automatically initiated as well by the ECU 100 or a different ECU as part of an assisted driving package.

In FIG. 3A, the subject vehicle 1 and the leading vehicle 3 are both traveling on the same road 30 and in the same driving lane 32. The direction of travel is upwards in the figure as shown by the arrow. As illustrated, the subject vehicle 1 is controlled to change lanes from the driving lane 32 to an adjacent lane 34. For example, the ECU 100 may communicate with the vehicle steering controller 132 to control the heading of the subject vehicle 1, thereby controlling the subject vehicle 1 to change lanes from the driving lane 32 to the adjacent lane 34. While the figures illustrate a case where the adjacent lane 34 is to the left of the driving lane 32, this example is not limiting. Instead, the adjacent lane 34 may be to the right of the driving lane 32 instead. Accordingly, the process shown in FIG. 3A corresponds to a lane change step.

Figure 3B:
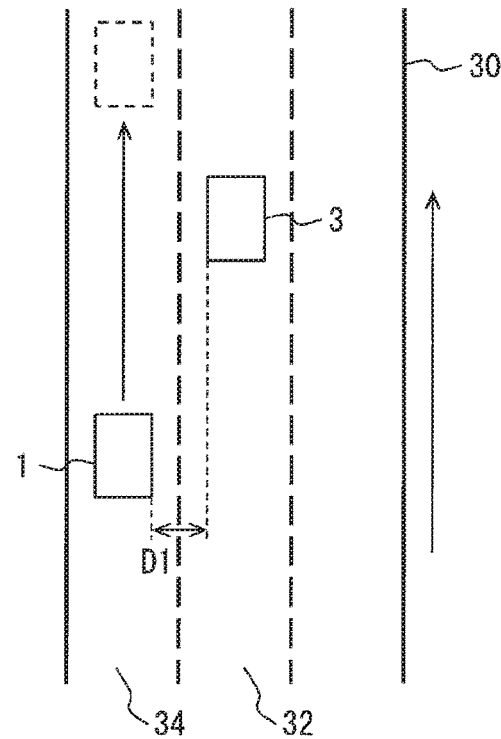
FIG. 3B shows a passing step during an assisted passing.

In FIG. 3B, the subject vehicle 1 is controlled to pass the leading vehicle 3. It should be noted that the term "pass" as used herein is intended to be distinct from the term "assisted passing". Specifically, an "assisted passing" refers to the entire three step process of FIGS. 3A to 3C as mentioned above, whereas the term "pass" or "passing" is intended to refer solely to the step depicted in FIG. 3B, i.e., the subject vehicle 1 passing the leading vehicle 3 in the front-rear direction. For example, the ECU 100 may communicate with the speed sensor 114 to detect the speed of the leading vehicle 3, and then communicate with the vehicle speed controller 122 to control the speed of the subject vehicle 1 such that the subject vehicle 1 passes the leading vehicle 3. Accordingly, the process shown in FIG. 3B corresponds to a passing step.

Figure 3C:
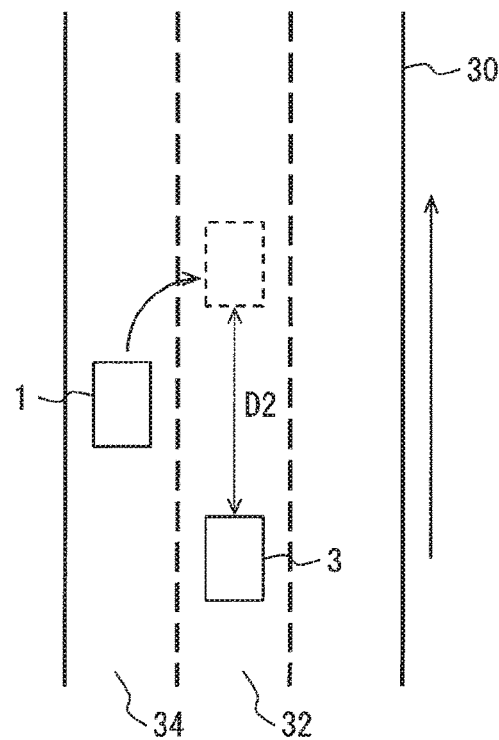
FIG. 3C shows a lane return step during an assisted passing.

In FIG. 3C, the subject vehicle 1 is controlled to return from the adjacent lane 34 to the driving lane 32. For example, the ECU 100 may communicate with the vehicle steering controller 132 to control the heading of the subject vehicle 1, thereby controlling the subject vehicle 1 to change lanes from the adjacent lane 34 to the driving lane 32. Accordingly, the process shown in FIG. 3C corresponds to a lane return step.

In the present embodiment, the subject vehicle 1 is configured to perform the assisted passing as described above based on a plurality of passing parameters which determine the characteristics of the assisted passing. In particular, in the present embodiment, the passing parameters include one or more from the group of: whether to perform the lane change step shown in FIG. 3A, a target speed or acceleration during the passing step shown in FIG. 3B, a minimum lateral distance between the subject vehicle 1 and the leading vehicle 3 during the passing step shown in FIG. 3B, whether to perform the lane return step shown in FIG. 3C, and a minimum following distance between the subject vehicle 1 and the leading vehicle 3 during the lane return step of FIG. 3C. In these examples, a lateral distance refers to the left-right direction in the figures, for example as denoted by distance D1 in FIG. 3B. Further, a following distance refers to the top-down direction the figures, for example as denoted by distance D2 in FIG. 3C.

Further, in the present embodiment, the ECU 100 is programmed to modify the passing parameters based on whether the leading vehicle 3 is oversized. This is because oversized vehicles may present additional safety concerns as compared to typical size passenger vehicles. For example, a vehicle which is oversized in height may have a higher chance of rollover when traveling on a curved road, and so passing such an oversized vehicle on a curved road may be dangerous. In addition to these safety concerns, a passenger may also feel more anxious when passing an oversized vehicle as compared to a typical size passenger vehicle. For example, even if passing a vehicle oversized in height on a curved road is determined to be objectively safe, a passenger may still feel anxious due to a perceived risk of a rollover.

Figures 4, 5:
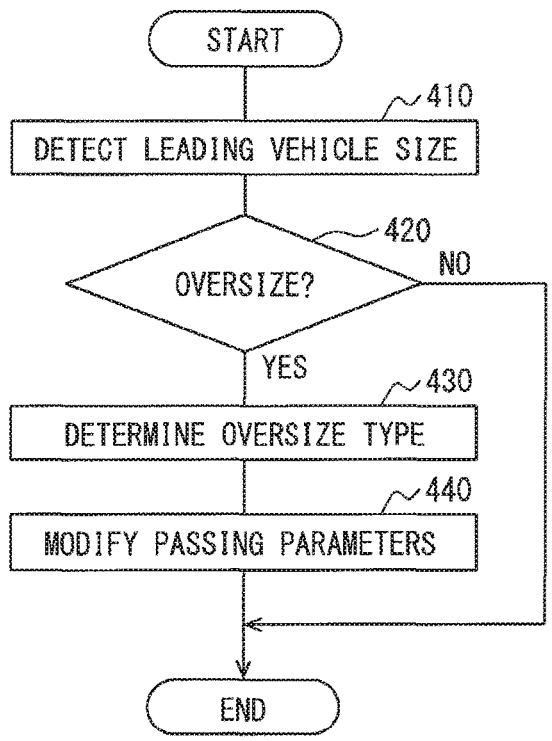
FIG. 4 shows a flow chart of a control process.
FIG. 5 shows an exemplary table of modifying passing parameters.

In view of the above, in the present embodiment, the ECU 100 is programmed to perform the control process shown in FIG. 4 during an assisted passing. It should be noted that "during an assisted passing" refers to the entire period from when the assisted passing is first initiated (i.e., prior to executing the lane change step shown in FIG. 3A) and until the assisted passing is completely finished (i.e., after executing the lane return step shown in FIG. 3C).

The control process shown in FIG. 4 begins at step 410, where the ECU 100 communicates with the vehicle size sensor 112 to detect the size of the leading vehicle 3. Next, at step 420, the ECU 100 determines whether the leading vehicle 3 is oversized or not. If the ECU 100 determines that the leading vehicle 3 is not oversized ("NO" at step 420), the ECU 100 terminates the control process. Conversely, if the ECU 100 determines that the leading vehicle 3 is oversized ("YES" at step 420), the ECU 100 continues to step 430.

At step 430, the ECU 100 determines the oversize type of the leading vehicle 3, i.e., whether the leading vehicle 3 is oversized in width, length, or height. In the present embodiment, the ECU 100 preferably determines the particular oversize combination of the leading vehicle 3, i.e., whether the leading vehicle 3 is oversized in width, length, height, width and length, width and height, length and height, or all of length, width, and height.

After step 430, the ECU 100 continues to step 440 and modifies the passing parameters. In the present embodiment, the ECU 100 preferably modifies the passing parameters based on the specific oversize combination of the leading vehicle 3. For example, the ECU 100 may modify the passing parameters differently dependent on whether the leading vehicle 3 is oversized in width, length, height, width and length, width and height, length and height, or all of length, width, and height. After modifying the passing parameters, the ECU 100 terminates the process.

In the present embodiment, the process of FIG. 4 is preferably performed continuously throughout the assisted passing. This is because, for example, the length of the leading vehicle 3 may be unknown when the subject vehicle 1 is directly behind the leading vehicle 3 as shown in the case of FIG. 3A, as an optical camera mounted on the subject vehicle 1 may be unable to see the length of the leading vehicle 3 from such a position. In this case, the length of the leading vehicle 3 may remain unknown until the assisted passing is partially performed, i.e., after the subject vehicle 1 changes from the driving lane 32 to the adjacent lane 34. As a result, even if the ECU 100 initially determines that the leading vehicle 3 is not oversized in width or height when the assisted passing is initiated, the ECU 100 may later determine that the leading vehicle 3 is oversized in length, after the lane change step is performed.

Next, specific examples of the ECU 100 modifying the passing parameters will be explained. As described above, the ECU 100 preferably performs the process of FIG. 4 continuously throughout the assisted passing. Accordingly, in the present embodiment, the ECU 100 preferably modifies the passing parameters based on a combination of the oversize type of the leading vehicle 3 as well as which step of the assisted passing (i.e., which of FIGS. 3A to 3C) the subject vehicle 1 is currently in. FIG. 5 is an exemplary reference table that shows how the ECU 100 of the present embodiment modifies the passing parameters based on a combination of oversize type and current step. It should be emphasized that the specifics of the table of FIG. 5 are exemplary and not intended to be limiting in any manner. The ECU 100 may, as appropriate, modify the passing parameters in the exact manner as shown in FIG. 5, or partially as shown in FIG. 5, or in an entirely different manner as shown in FIG. 5.

In the present embodiment, if the ECU 100 determines that the leading vehicle 3 is oversized in width, and the assisted passing is first initiated (i.e., prior to performing the lane change step shown in FIG. 3A), the ECU 100 determines whether to proceed with the lane change step shown in FIG. 3A based on road information. Specifically, the ECU 100 communicates with the road sensor 116 to determine the road type of the road 30, and then based on this information, the ECU 100 determines whether the lane change step shown in FIG. 3A should be performed. The ECU 100 may also communicate with the location sensor 118 to obtain the road information. As a result, the ECU 100 may terminate the lane change step of FIG. 3A if the adjacent lane 34 is too narrow (e.g., closed shoulder), is on a bridge, or is too curvy (e.g., based on a preset radius of curvature threshold). This is because passing a wide vehicle in these situations may present a real or perceived risk to a passenger. In this case, the ECU 100 effectively terminates the entire assisted passing, since the first step of the assisted passing (i.e., the lane change step of FIG. 3A) is canceled.

Next, if the ECU 100 determines that the leading vehicle 3 is oversized in width and the assisted passing is immediately prior to the passing step of FIG. 3B, the ECU 100 increases a minimum lateral distance between the subject vehicle 1 and the leading vehicle 3 during the passing step of FIG. 3B. Specifically, the minimum lateral distance is preferably increased as compared to when the leading vehicle 3 is a typical size passenger vehicle. This is to minimize any real or perceived risk to a passenger when passing a wide vehicle.

If the ECU 100 determines that the leading vehicle 3 is oversized in width and the assisted passing is immediately prior to the lane return step of FIG. 3C, the ECU 100 increases a minimum following distance between the subject vehicle 1 and the leading vehicle 3 (which is now behind the subject vehicle 1 as shown in FIG. 3C). Specifically, the minimum following distance is preferably increased as compared to when the leading vehicle 3 is a typical size passenger vehicle. This is to minimize any real or perceived risk to a passenger when return to the driving lane 32 in the vicinity of a wide vehicle.

In the present embodiment, if the ECU 100 determines that the leading vehicle 3 is oversized in length, it is assumed that the assisted passing has already completed the lane changing step of FIG. 3A, since it is generally difficult for the ECU 100 to determine the length of the leading vehicle 3 while the subject vehicle 1 is still directly behind the leading vehicle 3 (i.e., prior to performing the lane change step shown in FIG. 3A).

Accordingly, if the ECU 100 determines that the leading vehicle 3 is oversized in length and the assisted passing is immediately prior to the passing step of FIG. 3B, the ECU 100 determines whether to proceed with the passing step based on road information. Specifically, the ECU 100 communicates with the road sensor 116 to determine the road type of the road 30, and then based on this information, the ECU 100 determines whether the passing step of FIG. 3B should be performed. For example, the ECU 100 may cancel the passing step of FIG. 3B (i.e., terminate the assisted passing) if the adjacent lane 34 is too curvy, since passing a long vehicle on a curved road may present a real or perceived risk to a passenger. In this case, the ECU 100 may terminal the assisted passing by controlling the subject vehicle 1 to remain in the adjacent lane 34, or terminate the assisted passing by controlling the subject vehicle 1 to return to the driving lane 32 behind the leading vehicle 3.

Next, if the ECU 100 determines that the leading vehicle 3 is oversized in length and the assisted passing is immediately prior to the lane return step of FIG. 3C, the ECU 100 increases a minimum following distance between the subject vehicle 1 and the leading vehicle 3 (which is now behind the subject vehicle 1 as shown in FIG. 3C). Specifically, the minimum following distance is preferably increased as compared to when the leading vehicle 3 is a typical size passenger vehicle. This is to minimize any real or perceived risk to a passenger when return to the driving lane 32 in the vicinity of a long vehicle.

In the present embodiment, if the ECU 100 determines that the leading vehicle 3 is oversized in height, and the assisted passing is first initiated (i.e., prior to performing the lane change step shown in FIG. 3A), the ECU 100 determines whether to proceed with the lane change step shown in FIG. 3A based on road information. Specifically, the ECU 100 communicates with the road sensor 116 to determine the road type of the road 30, and then based on this information, the ECU 100 determines whether the lane change step shown in FIG. 3A should be performed. For example, the ECU 100 may terminate the lane change step of FIG. 3A if the adjacent lane 34 is too curvy, since passing a tall vehicle on a curvy road may present a real or perceived risk of rollover to a passenger. In this case, the ECU 100 effectively terminates the entire assisted passing, since the first step of the assisted passing (i.e., the lane change step of FIG. 3A) is canceled.

Next, if the ECU 100 determines that the leading vehicle 3 is oversized in height and the assisted passing is immediately prior to the lane return step of FIG. 3C, the ECU 100 increases a minimum following distance between the subject vehicle 1 and the leading vehicle 3 (which is now behind the subject vehicle 1 as shown in FIG. 3C). Specifically, the minimum following distance is preferably increased as compared to when the leading vehicle 3 is a typical size passenger vehicle. This is to minimize any real or perceived risk to a passenger when return to the driving lane 32 in the vicinity of a tall vehicle.

As described above, the ECU 100 of the present disclosure detects the size of the leading vehicle 3 during an assisted passing, and modifies the passing parameters of the assisted passing based on the size of the leading vehicle 3, including terminating the assisted passing when appropriate. In this regard, the assisted passing may be performed while taking into account of the size of the leading vehicle 3, thereby increasing the safety and comfort of a passenger.

Other Embodiments

The present disclosure is described with reference to the above embodiments, but these embodiments are not intended to be limiting. A variety of modifications which do not depart from the gist of the present disclosure are contemplated.

In the above described embodiments, the ECU 100 continuously performs the process of FIG. 4 during the assisted passing. However, the ECU 100 may instead perform the process of FIG. 4 only once. For example, the ECU 100 may precisely obtain the size of the leading vehicle 3 through inter-vehicle communications, and then appropriately modify the passing parameters of the entire assisted passing based on this information.

In the above described embodiments, the control process of FIG. 4 is depicted with a plurality of steps for completeness, but these steps may be combined or omitted as appropriate. For example, the ECU 100 may directly determine the oversize type of the leading vehicle 3 at step 410, and then immediately proceed to step 440 to modify the passing parameters based on the oversize type of the leading vehicle 3.

In the above described embodiments, the ECU 100 detects whether the leading vehicle 3 is oversized in any or all of width, length, and height. However, in an alternative embodiment, the ECU 100 may detect whether the leading vehicle 3 is oversized in one of width, length, or height only, and disregard the remaining two dimensions.

The above embodiments are described with respect to a leading vehicle 3 directly in front of the subject vehicle 1. However, the present disclosure is also applicable to an adjacent vehicle which is adjacent to the subject vehicle 1, i.e., in an adjacent lane. In this case, an "assisted passing" would be defined as only including the passing step of FIG. 3B, i.e., excluding the lane change step of FIG. 3A and the lane return step of 3C. Further, the ECU 100 would only modify passing parameters related to the passing step of FIG. 3B, for example as shown under the "PRIOR TO PASSING STEP" heading in the table of FIG. 5.

The present disclosure includes implementation as a vehicle controller, which is a processor that includes a CPU and a memory. The vehicle controller is programmed to execute the control processes described with respect to the above described embodiments.

The invention claimed is:

1. A vehicle system, comprising:
a vehicle size sensor mounted in a subject vehicle, the vehicle size sensor configured to detect whether a leading vehicle in front of the subject vehicle is oversized in width, length, or height; and
a processor coupled to the subject vehicle and the vehicle size sensor, wherein:
the subject vehicle is configured to perform an assisted passing of the leading vehicle based on a passing parameter that defines a characteristic of the assisted passing;
the processor is programmed to, during the assisted passing:
communicate with the vehicle size sensor to determine whether the leading vehicle is oversized; and
modify the passing parameter when the leading vehicle is determined to be oversized;
the processor is programmed to control the subject vehicle to perform the assisted passing by:
controlling a heading of the subject vehicle to change lanes from a driving lane to an adjacent lane;
controlling a speed of the subject vehicle in the adjacent lane to pass the leading vehicle in the driving lane; and
controlling the heading of the subject vehicle to return to the driving lane after passing the leading vehicle; and
when the leading vehicle is oversized in length, the processor modifies the passing parameter by increasing the speed of the subject vehicle when passing the leading vehicle.

2. The vehicle system of claim 1, wherein
when the leading vehicle is oversized in width, the processor modifies the passing parameter by increasing a minimum lateral distance between the subject vehicle and the leading vehicle when passing the leading vehicle.

3. The vehicle system of claim 1, wherein
the processor modifies the passing parameter by:
terminating the assisted passing, or
increasing a minimum following distance between the subject vehicle and the leading vehicle when returning to the driving lane.

4. The vehicle system of claim 1, further comprising:
a road sensor mounted in the subject vehicle, the road sensor detecting a road type of a road on which the subject vehicle is travelling, wherein
the processor is programmed to, during the assisted passing
communicate with the road sensor to determine the road type of the road, and
modify the passing parameter based on the determined road type when the leading vehicle is determined to be oversized.

5. The vehicle system of claim 4, wherein
the processor is programmed to terminate the assisted passing when the leading vehicle is determined to be oversized in width and the road type of the road is determined to be narrow.

6. The vehicle system of claim 4, wherein
the processor is programmed to terminate the assisted passing when the leading vehicle is determined to be oversized in width and the road type of the road is determined to be curved.

7. The vehicle system of claim 4, wherein
the processor is programmed to terminate the assisted passing when the leading vehicle is determined to be oversized in height and the road type of the road is determined to be curved.

8. A vehicle controller for controlling a subject vehicle, comprising:
a central processing unit; and
a memory coupled to the central processing unit, wherein:
the central processing unit is coupled to a vehicle size sensor mounted in the subject vehicle, the vehicle size sensor configured to detect whether a leading vehicle in front of the subject vehicle is oversized in width, length, or height;

the central processing unit is programmed to, when the subject vehicle is performing an assisted passing of the leading vehicle based on a passing parameter that defines a characteristic of the assisted passing:
  communicate with the vehicle size sensor to determine whether the leading vehicle is oversized; and
  modify the passing parameter when the leading vehicle is determined to be oversized;
the central processing unit is programmed to control the subject vehicle to perform the assisted passing by:
  controlling a heading of the subject vehicle to change lanes from a driving lane to an adjacent lane;
  controlling a speed of the subject vehicle in the adjacent lane to pass the leading vehicle in the driving lane; and
  controlling the heading of the subject vehicle to return to the driving lane after passing the leading vehicle; and
when the leading vehicle is oversized in length, the central processing unit modifies the passing parameter by increasing the speed of the subject vehicle when passing the leading vehicle.

9. The vehicle controller of claim 8, wherein
the central processing unit is coupled to a road sensor mounted in the subject vehicle, the road sensor detecting a road type of a road on which the subject vehicle is travelling, and
the central processing unit is programmed to, during the assisted passing
  communicate with the road sensor to determine the road type of the road, and
  modify the passing parameter based on the determined road type when the leading vehicle is determined to be oversized.

10. The vehicle system of claim 9, wherein
the central processing unit is programmed to terminate the assisted passing when the leading vehicle is determined to be oversized in width and the road type of the road is determined to be narrow.

11. The vehicle system of claim 9, wherein
the central processing unit is programmed to terminate the assisted passing when the leading vehicle is determined to be oversized in width and the road type of the road is determined to be curved.

12. The vehicle system of claim 9, wherein
the central processing unit is programmed to terminate the assisted passing when the leading vehicle is determined to be oversized in height and the road type of the road is determined to be curved.

13. The vehicle controller of claim 8, wherein
the central processing unit modifies the passing parameter by:
  terminating the assisted passing, or
  increasing a minimum following distance between the subject vehicle and the leading vehicle when returning to the driving lane.

14. The vehicle controller of claim 8, wherein
when the leading vehicle is oversized in width, the central processing unit modifies the passing parameter by increasing a minimum lateral distance between the subject vehicle and the leading vehicle when passing the leading vehicle.

\* \* \* \* \*